(12) United States Patent
Murotani et al.

(10) Patent No.: US 9,551,955 B2
(45) Date of Patent: Jan. 24, 2017

(54) OPTICAL SCANNING APPARATUS AND IMAGE FORMING APPARATUS

(71) Applicant: CANON KABUSHIKI KAISHA, Tokyo (JP)

(72) Inventors: Taku Murotani, Mishima (JP); Junya Azami, Mishima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/970,119

(22) Filed: Dec. 15, 2015

(65) Prior Publication Data
US 2016/0179028 A1    Jun. 23, 2016

(30) Foreign Application Priority Data

Dec. 22, 2014   (JP) .................................. 2014-259000
Oct. 7, 2015    (JP) .................................. 2015-199219

(51) Int. Cl.
| | |
|---|---|
| G03G 15/043 | (2006.01) |
| G03G 21/16 | (2006.01) |
| G02B 26/10 | (2006.01) |
| B41J 2/47 | (2006.01) |
| B41J 29/17 | (2006.01) |
| G02B 26/12 | (2006.01) |
| G03G 15/04 | (2006.01) |

(52) U.S. Cl.
CPC ............ *G03G 15/043* (2013.01); *B41J 2/471* (2013.01); *B41J 29/17* (2013.01); *G02B 26/12* (2013.01); *G03G 15/04072* (2013.01); *G03G 2215/0132* (2013.01)

(58) Field of Classification Search
CPC .............. G03G 15/043; G03G 21/1666; G03G 2221/1636; G02B 26/10
See application file for complete search history.

(56) References Cited

U.S. PATENT DOCUMENTS

| | | | |
|---|---|---|---|
| 6,628,444 B2 | 9/2003 | Azami | 359/204 |
| 7,277,655 B2 | 10/2007 | Namba | 399/98 |
| 7,352,377 B2 | 4/2008 | Matsutomo | 347/136 |
| 7,508,859 B2 | 3/2009 | Azami et al. | 372/101 |
| 2005/0195272 A1 | 9/2005 | Azami | 347/238 |

(Continued)

FOREIGN PATENT DOCUMENTS

| | | |
|---|---|---|
| JP | 2005-313459 | 11/2005 |
| JP | 2006-044229 | 2/2006 |
| JP | 2013-029740 | 2/2013 |

*Primary Examiner* — Sandra Brase
(74) *Attorney, Agent, or Firm* — Fitzpatrick, Cella, Harper & Scinto

(57) ABSTRACT

The image forming apparatus includes the optical scanning apparatus configured to scan a surface of an image bearing member provided in an image forming apparatus body with a laser beam. The optical scanning apparatus is inserted through an insertion opening formed in a frame member of the image forming apparatus body and supported by a support member mounted to the frame member. A housing of the optical scanning apparatus has an opening that allows passage of the laser beam, and includes a transparent dustproof member that covers the opening. On the surface side of the housing on which the dustproof member is provided, a plurality of projecting portions projecting with respect to the dustproof member are provided.

16 Claims, 13 Drawing Sheets

(56) References Cited

U.S. PATENT DOCUMENTS

2009/0245850 A1* 10/2009 Kawai .............. G03G 15/04054
                                                        399/98
2012/0200655 A1*  8/2012 Serizawa ................ B41J 2/471
                                                        347/224
2013/0100509 A1*  4/2013 Igarashi ................ G02B 26/10
                                                        358/510

* cited by examiner

OPTICAL SCANNING APPARATUS AND IMAGE FORMING APPARATUS

BACKGROUND OF THE INVENTION

1. Field of the Invention

The present invention relates to an optical scanning apparatus configured to scan a surface to be scanned with a laser beam, and to an image forming apparatus having the optical scanning apparatus mounted thereto.

2. Description of the Related Art

A housing of an optical scanning apparatus has an opening (aperture) that allows passage of a laser beam to be radiated onto a photosensitive drum (surface to be scanned). Some optical scanning apparatus include a dustproof member (transparent member) provided in the housing of the optical scanning apparatus, which is configured to cover the opening in order to prevent entry of dust and the like into the optical scanning apparatus through the opening (Japanese Patent Application Laid-Open No. 2006-044229).

However, it is considered that, at the time of mounting the optical scanning apparatus into a frame member of the image forming apparatus, the dustproof member may be brought into contact with a member provided in the image forming apparatus. In this case, the dustproof member provided in the optical scanning apparatus may be damaged. In particular, this problem is liable to occur in a structure in which the dustproof member projects from the housing of the optical scanning apparatus.

SUMMARY OF THE INVENTION

The present invention has been made in view of the above-mentioned problem, and it is an object of the present invention to provide an optical scanning apparatus capable of suppressing damage on a dustproof member (transparent member), and to provide an image forming apparatus.

It is another object of the present invention to provide an image forming apparatus, including a photosensitive member, and an optical scanning unit configured to scan the photosensitive member with a laser beam, the optical scanning unit comprising a housing having an aperture through which the laser beam is to be emitted; and a transparent member provided at the aperture, wherein the housing comprises a projecting portion projecting in a laser emitting direction with respect to the transparent member, the projecting portion being provided in an area of the housing outside an area in which the transparent member is provided, in a main scanning direction and outside the area in which the transparent member is provided, in a sub-scanning direction.

It is still another object of the present invention to provide an optical scanning apparatus configured to scan a surface to be scanned with a laser beam, the optical scanning apparatus including a housing having an aperture through which the laser beam is to be emitted, and a transparent member provided at the aperture, wherein the housing comprises a projecting portion projecting in a laser emitting direction with respect to the transparent member, the projecting portion being provided in an area of the housing outside an area in which the transparent member is provided, in a main scanning direction and outside the area in which the transparent member is provided, in a sub-scanning direction.

It is still another object of the present invention to provide an image forming apparatus, including a first photosensitive member, a second photosensitive member, and an optical scanning unit configured to scan the first photosensitive member and the second photosensitive member with a first laser beam and a second laser beam, the optical scanning unit including a housing having a first aperture through which the first laser beam is to be emitted and a second aperture through which the second laser beam is to be emitted, a first transparent member provided at the first aperture, and a second transparent member provided at the second aperture, wherein the housing comprises a projecting portion projecting in a laser emitting direction with respect to the first transparent member and the second transparent member, the projecting portion being provided in an area between the first and second transparent members, and the area outside an area in which the first and second transparent members are provided, in a main scanning direction.

It is still another object of the present invention to provide an optical scanning apparatus configured to scan a surface to be scanned with a laser beam, the optical scanning apparatus including a housing having a first aperture through which a first laser beam is to be emitted and a second aperture through which a second laser beam is to be emitted, a first transparent member provided at the first aperture, and a second transparent member provided at the second aperture, wherein the housing comprises a projecting portion projecting in a laser emitting direction with respect to the first transparent member and the second transparent member, the projecting portion being provided in an area between the first and second transparent members, and the area outside an area in which the first and second transparent members are provided, in a main scanning direction.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Note that, dimensions, materials, and shapes of components described in the embodiments, a relative arrangement thereof, and other such factors may be appropriately changed depending on structures of apparatus to which the present invention is applied or various conditions, and are not intended to limit the scope of the present invention to the following embodiments.

First Embodiment

Image Forming Apparatus

Figure 1:
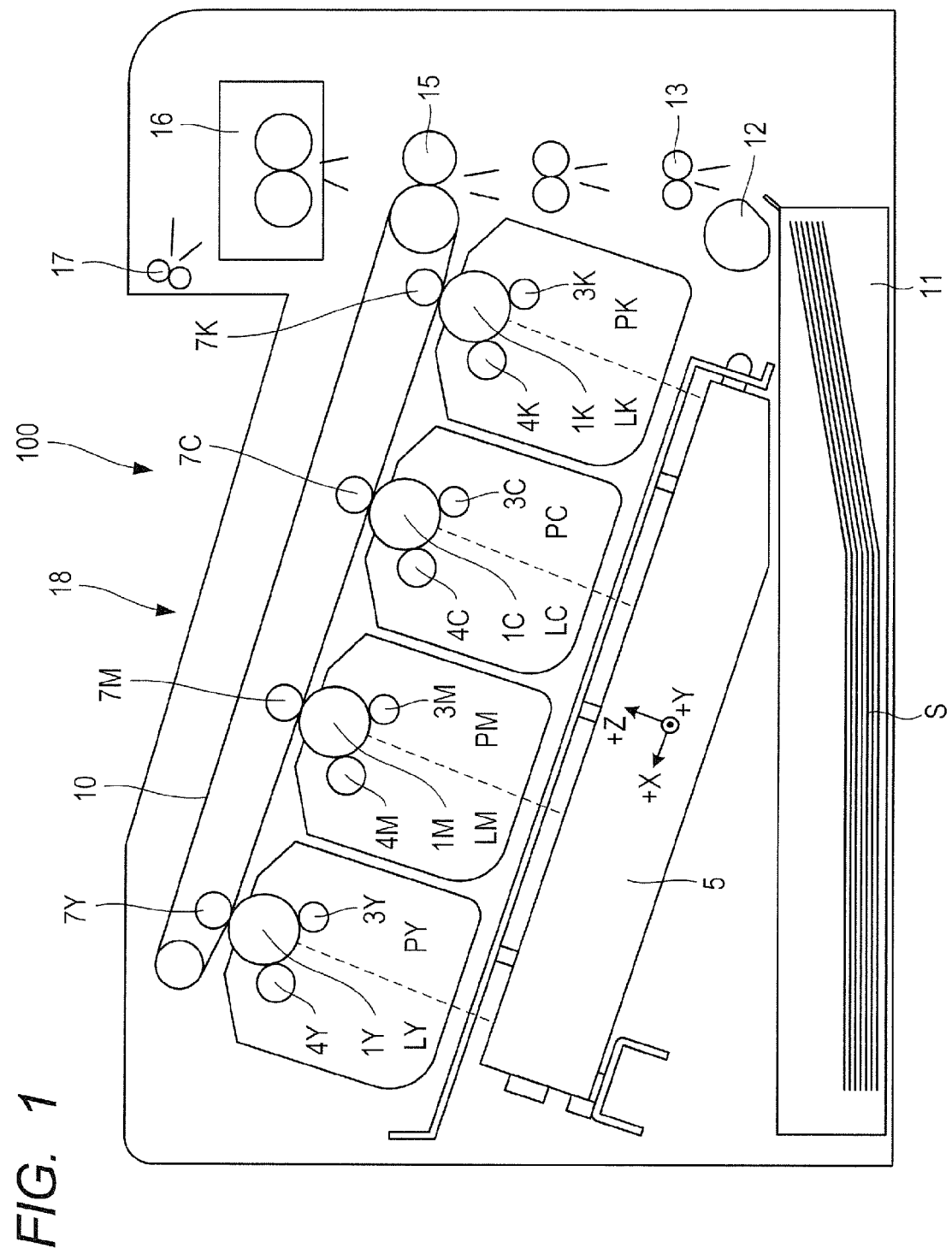
FIG. 1 is a schematic view of an image forming apparatus having an optical scanning apparatus mounted thereto according to a first embodiment of the present invention.

FIG. 1 is a schematic view of an image forming apparatus having an optical scanning apparatus mounted thereto according to a first embodiment of the present invention. An image forming apparatus 100 is an electrophotographic color image forming apparatus configured to form a toner image on a recording material S through use of developers (toners) of four colors that are yellow Y, magenta M, cyan C, and black K. In FIG. 1, the surfaces (surfaces to be scanned) of photosensitive drums (image bearing members) 1Y to 1K, which are uniformly charged by charge rollers 3Y to 3K serving as charge devices, are irradiated with laser beams LY to LK. The laser beams LY to LK are emitted from an optical scanning apparatus 5 serving as an exposure device corresponding to each of the laser beams based on image data from an image data input portion. With this, electrostatic latent images are formed on the surfaces of the photosensitive drums 1Y to 1K.

The toners of the respective colors are supplied from developing rollers 4Y to 4K in developing units serving as developing devices to the electrostatic latent images formed on the surfaces of the photosensitive drums 1Y to 1K, to thereby form toner images in the respective colors on the surfaces of the photosensitive drums 1Y to 1K. Further, an intermediate transfer belt 10 is stretched and arranged so as to face each of the photosensitive drums 1Y to 1K. The toner images in the respective colors formed on the surfaces of the respective photosensitive drums 1Y to 1K are primarily transferred sequentially to the outer peripheral surface of the intermediate transfer belt 10. This primary transfer is performed by applying a primary transfer bias voltage to each of primary transfer rollers 7Y to 7K that are arranged on the inner peripheral surface side of the intermediate transfer belt 10 to serve as primary transfer devices.

Meanwhile, the recording material S is stacked on a feeding cassette 11. The recording material S is fed by a feeding roller 12, and then conveyed by conveyance rollers 13. After that, the recording material S is conveyed at a predetermined timing to a secondary transfer portion formed of a nip portion between the intermediate transfer belt 10 and a secondary transfer roller 15 serving as a secondary transfer device. Through application of a secondary transfer bias voltage to the secondary transfer roller 15, the toner image on the outer peripheral surface of the intermediate transfer belt 10 is transferred onto the recording material S. After the recording material S is nipped and conveyed by the secondary transfer roller 15 and the intermediate transfer belt 10 in the secondary transfer portion, the recording material S is conveyed to a fixing unit 16 serving as a fixing device, and is heated and pressurized by the fixing unit 16. The recording material S having the toner image fixed thereto by the fixing unit 16 is then discharged by discharge rollers 17.

<Optical Scanning Apparatus (Optical Scanning Unit)>

Figure 2:
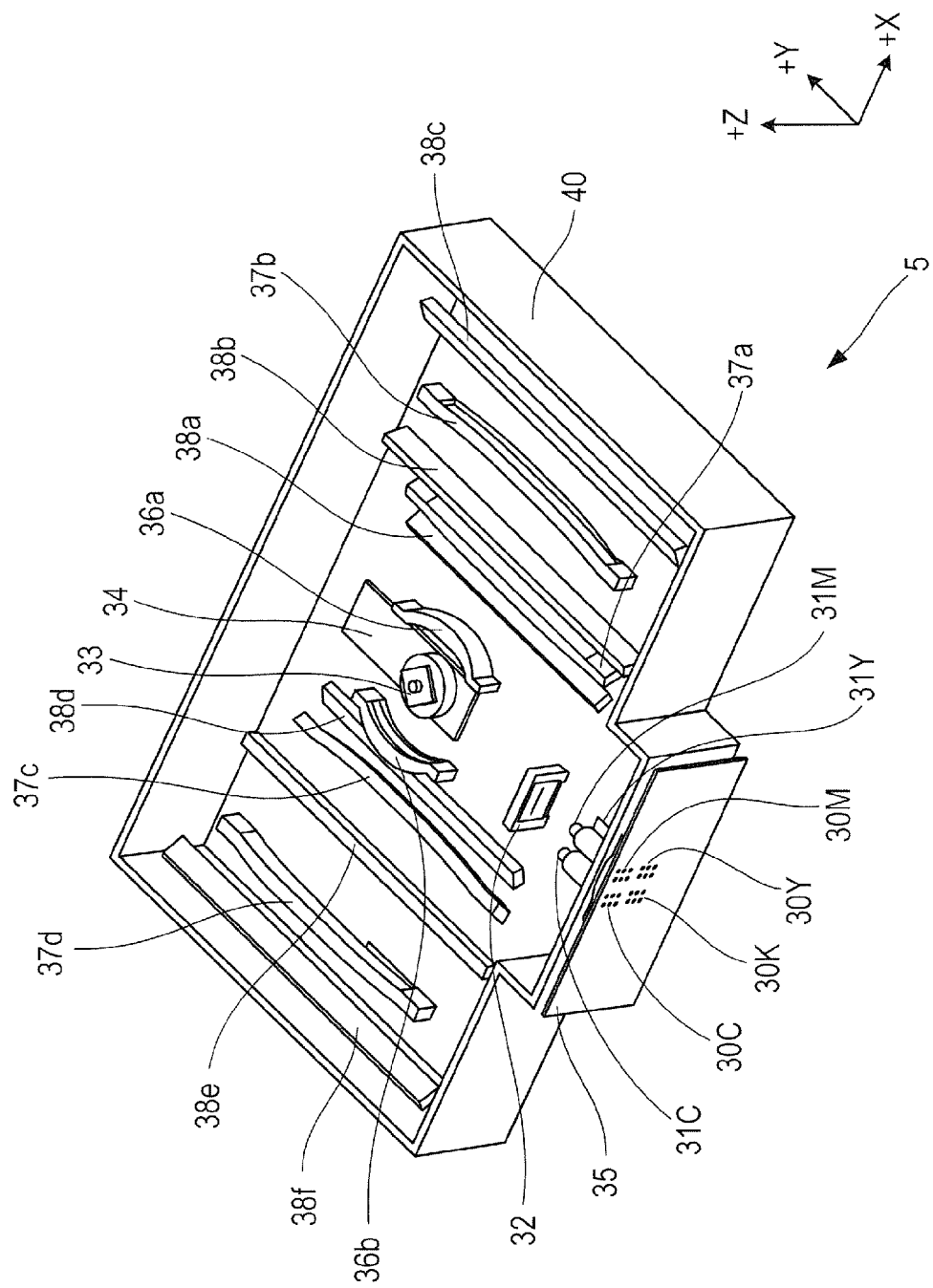
FIG. 2 is a view for illustrating the inside of the optical scanning apparatus including projecting portions according to the first embodiment of the present invention.
Figure 3:
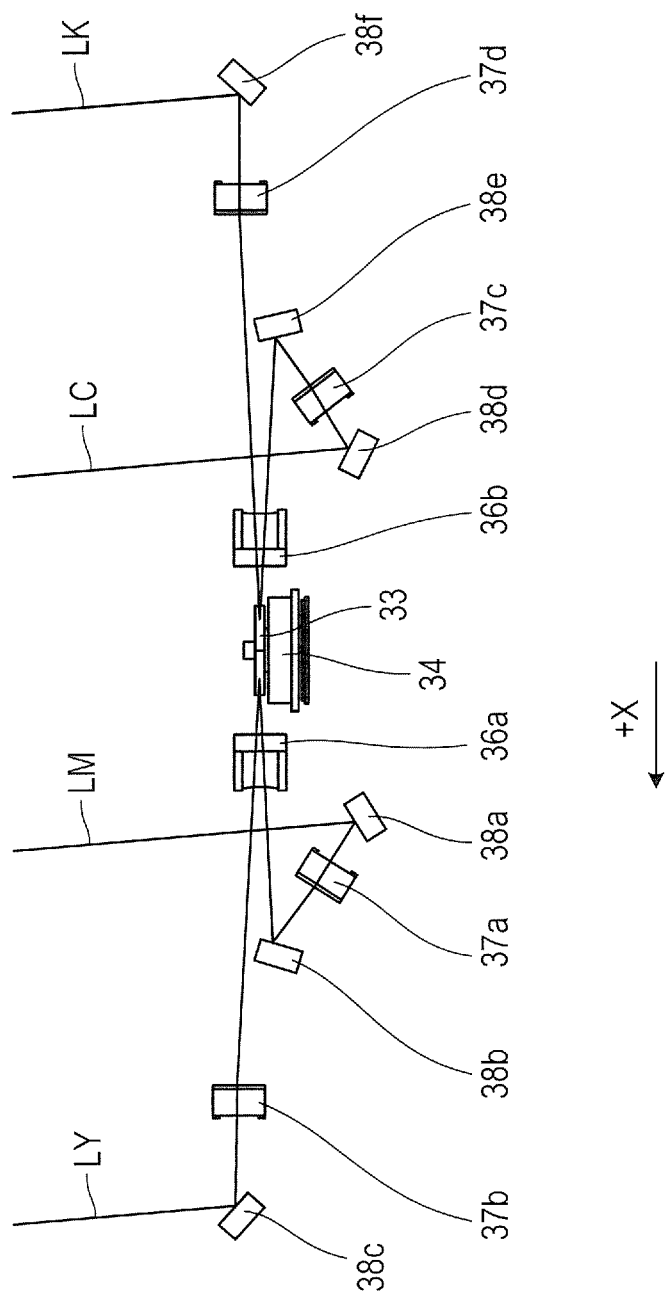
FIG. 3 is a view for illustrating optical paths in an optical system of the optical scanning apparatus according to the first embodiment of the present invention.

Next, an overall configuration of the optical scanning apparatus 5 is described with reference to FIG. 2 and FIG. 3. FIG. 2 is an illustration of the inside of the optical scanning apparatus 5 according to this embodiment. Further, in FIG. 2, a scanner cover of the optical scanning apparatus 5 is removed. FIG. 3 is a view for illustrating a scanning optical system of the optical scanning apparatus 5. FIG. 3 is a view of the scanning optical system when viewed from the +Y direction in FIG. 2.

The laser beams LY to LK emitted from semiconductor lasers 30Y to 30K, which are controlled to be driven by a laser drive circuit board 35, are converted to laser light fluxes collimated by collimator lenses 31Y to 31C for yellow, magenta and cyan, and by an unshown collimator lens for black. The laser beams LY to LK are transmitted through a cylindrical lens 32 and therefore converged only in a direction (Z direction) corresponding to a sub-scanning direction (X direction), to thereby form images as line images on the reflection surface of a rotary polygon mirror 33. The apparatus configuration described above serves as an incident optical system.

The rotary polygon mirror 33 is rotationally driven by a scanner motor 34 to deflect each of the laser beams LY to LK. The laser beam LY and the laser beam LM deflected by the rotary polygon mirror 33 are transmitted through a first scanning lens 36a. The laser beam LY is transmitted through a second scanning lens 37b and reflected by a reflection mirror 38c, to thereby form an image as a spot image on the photosensitive drum (surface to be scanned) 1Y (see FIG. 1). Meanwhile, the laser beam LM is reflected by a reflection mirror 38b, and then transmitted through a second scanning lens 37a and reflected by a reflection mirror 38a, to thereby form an image on the photosensitive drum 1M (see FIG. 1).

Further, when a direction (main scanning direction) in which the laser beam LY and the laser beam LM are deflected by the rotary polygon mirror 33 is assumed to be +Y, the laser beam LC and the laser beam LK are deflected to the −Y side. The laser beam LC and the laser beam LK deflected by the rotary polygon mirror 33 are transmitted through a first scanning lens 36b. The laser beam LC is reflected by a reflection mirror 38e, and then transmitted through a third scanning lens 37c and reflected by a reflection mirror 38d, to thereby form an image on the photosensitive drum 1C (see FIG. 1). Further, the laser beam LK is transmitted through a fourth scanning lens 37b and reflected by a reflection mirror 38f, to thereby form an image as a spot image on the photosensitive drum 1K (see FIG. 1). The apparatus configuration described above serves as a scanning optical system.

The scanning optical system as described above guides scanning beams to the surfaces of the four photosensitive drums 1Y to 1K illustrated in FIG. 1, to thereby perform image recording. Specifically, due to changes in angles of deflection of the laser beams LY to LK through rotation of the rotary polygon mirror 33, the respective spot images, which are formed by the laser beams LY to LK, move on the surfaces of the photosensitive drums 1Y to 1K in axial directions of the photosensitive drums (main scanning). Further, through rotation of the photosensitive drums 1Y to 1K, the respective spot images move on the surfaces of the photosensitive drums 1Y to 1K to the upstream side in rotating directions of the photosensitive drums 1Y to 1K (sub-scanning). The optical scanning apparatus 5 is constructed by accurately accommodating the incident optical system and the plurality of scanning optical systems in an optical box 40 that is a part of a housing of the optical scanning apparatus 5. Note that, the X direction in FIG. 2 is the sub-scanning direction.

<Scanner Cover>

Figure 4:
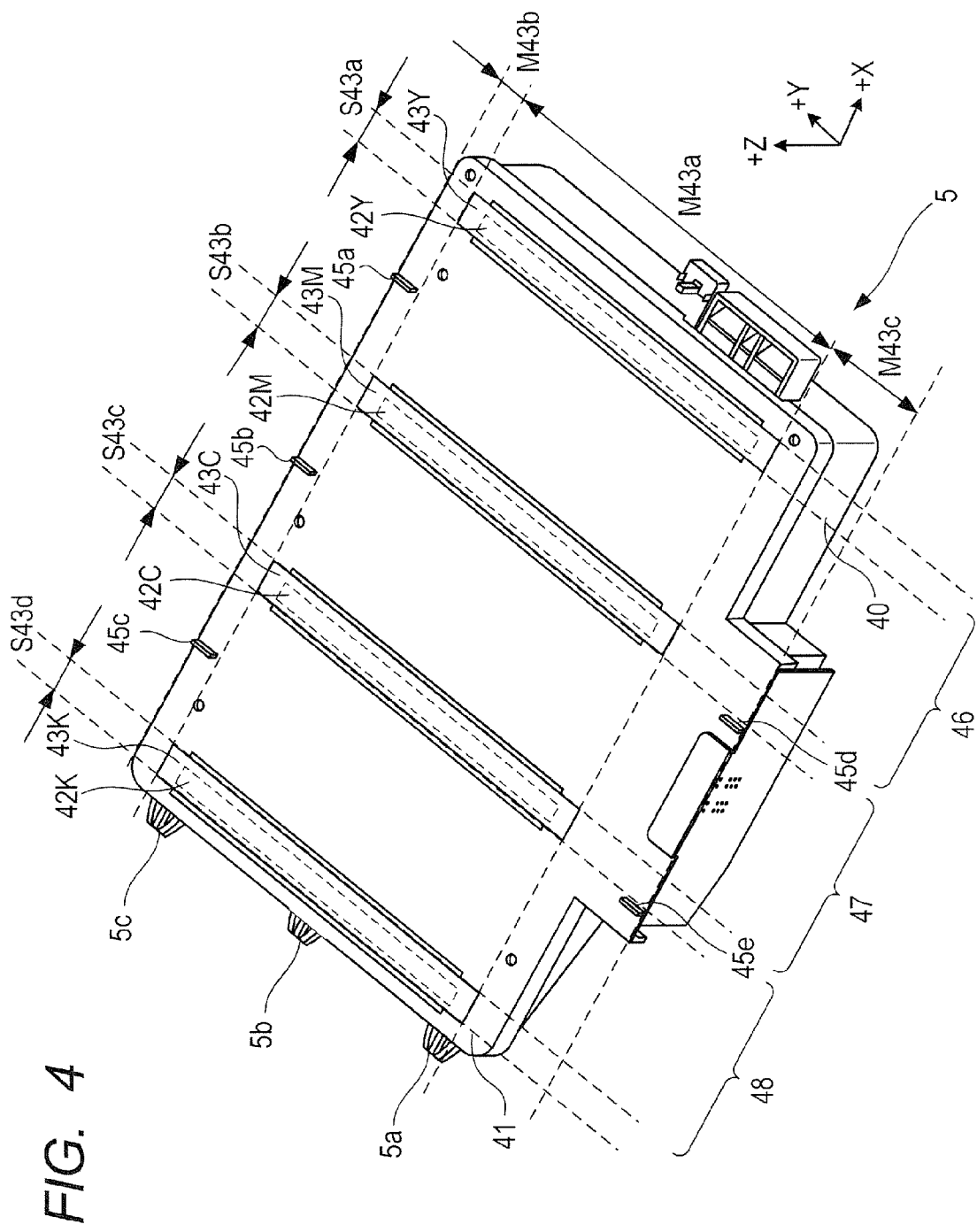
FIG. 4 is an external view of the optical scanning apparatus including the projecting portions according to the first embodiment of the present invention.

Next, a characteristic configuration according to this embodiment is described with reference to FIG. 4. The optical scanning apparatus 5 includes a scanner cover 41 configured to seal the optical box 40 including optical components such as the scanning lens 36a, the scanning lens 36b, the scanning lenses 37a to 37d, and the reflection mirrors 38a to 38f illustrated in FIG. 2 and FIG. 3. The optical box 40 and the scanner cover 41 constitute the housing of the optical scanning apparatus 5.

The scanner cover 41 has openings (apertures) 42Y to 42K that allow passage of the laser beams LY to LK to be radiated onto the surfaces of the photosensitive drums 1Y to 1K. The openings 42Y to 42K are covered by dustproof members (transparent members) 43Y to 43K that are made of glass and have transparency. The dustproof members 43Y to 43K are fixed to the scanner cover 41 with an adhesive, a double sided tape, or the like (not shown), and are provided so as to project from the outer surface of the scanner cover 41.

Further, the scanner cover 41, which is a part of the housing, includes projecting portions 45 (45a to 45e). FIG. 4 is an illustration of an area M43a in which the dustproof members 43 (43Y to 43K) of the scanner cover 41 are provided in the main scanning direction (Y direction), and areas S43a to S43d in which the dustproof members 43 (43Y to 43K) of the scanner cover 41 are provided in the sub-scanning direction (X direction). The projecting portions 45 (45a to 45e) are provided in an area M43b and an area M43c located at a portion outside the area M43a in the main scanning direction and in areas 46 to 48 located at a portion outside the areas S43a to S43d in the sub-scanning direction. Further, the projecting portions 45 (45a to 45e) are provided integrally with the scanner cover 41 while projecting with respect to the dustproof members 43Y to 43K in a direction in which the dustproof members 43Y to 43K project from the scanner cover 41 (laser emitting direction (+Z direction)). Moreover, at least one projecting portion 45 is provided in each of the areas 46, 47, and 48 that is an area between two dustproof members. Particularly in the area 47, the projecting portions 45b and 45d are provided respectively in the two areas M43b and M43c located at a portion outside the area M43a in the main scanning direction (Y direction). Also in the area 48, the projecting portions 45c and 45e are provided respectively in the two areas M43b and M43c. The projecting portions 45a to 45c are arranged at regular intervals in the scanner cover 41. Further, the projecting portions 45a to 45e are arranged in the vicinities of both ends of the scanner cover 41 in the main scanning direction (Y direction).

<Cleaning Member>

Figure 5:
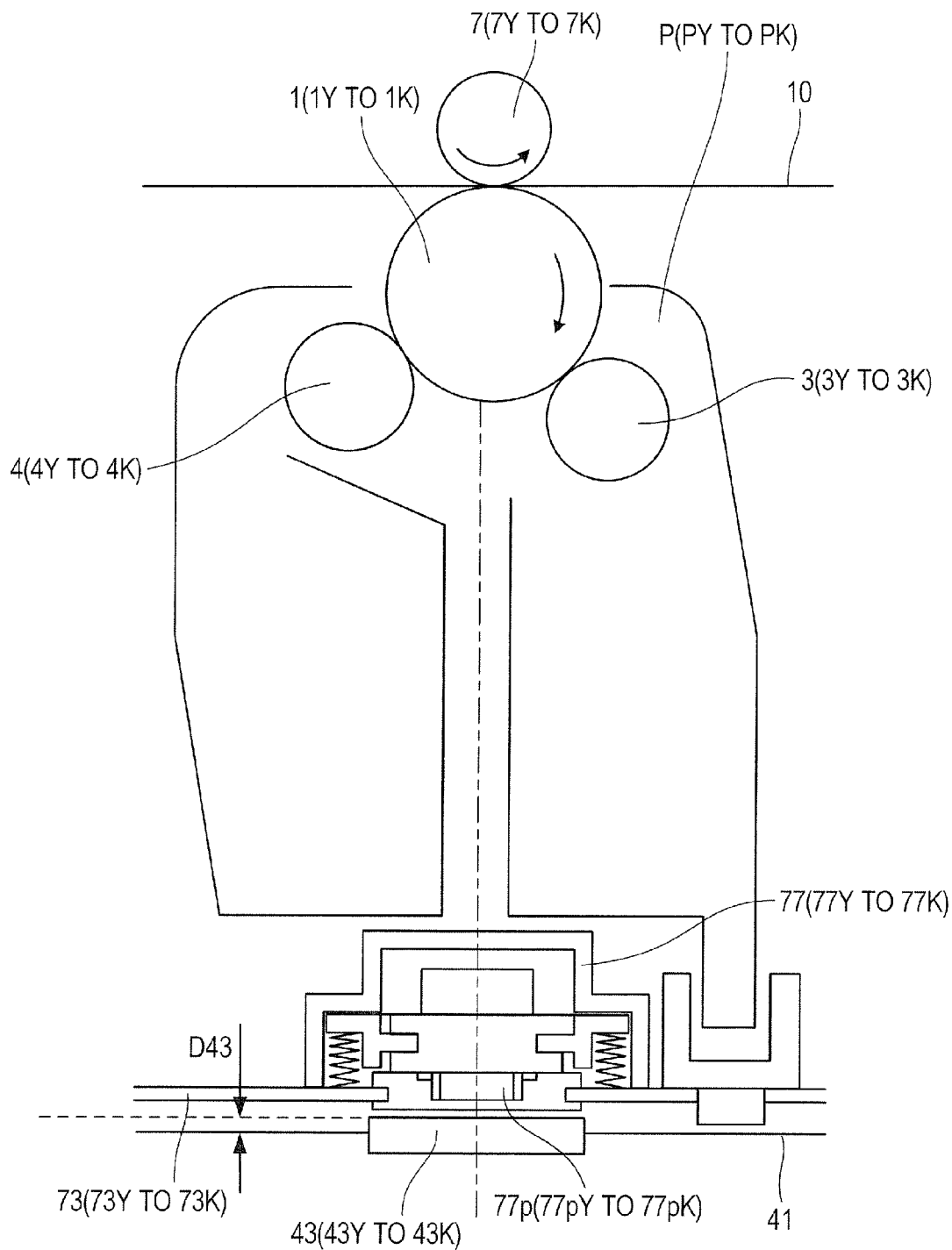
FIG. 5 is a view for illustrating a cleaning member configured to clean a dustproof member in the optical scanning apparatus.
Figure 6:
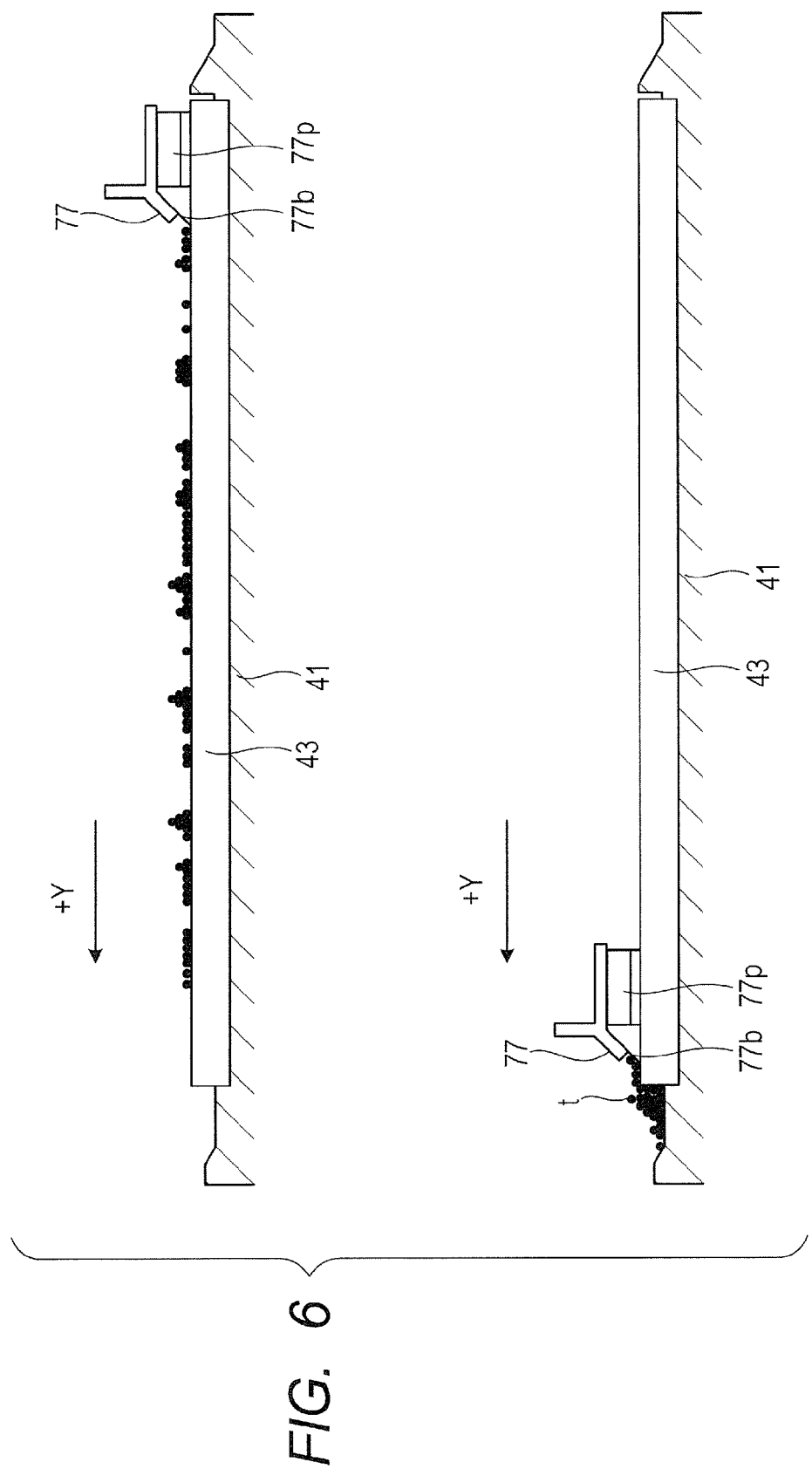
FIG. 6 is a view for illustrating a state in which the cleaning member cleans the dustproof member.

FIG. 5 is a view for illustrating a cleaning member provided in a frame member of the image forming apparatus, which is configured to clean the dustproof member. Further, FIG. 6 is a view for illustrating a state in which the cleaning member cleans the dustproof member. Operation of cleaning members 77 (77Y to 77K) for cleaning the surfaces of the dustproof members 43 (43Y to 43K) is described with reference to FIG. 5 and FIG. 6. The cleaning members 77 include cleaning sheets 77b, including a cleaning sheet respectively corresponding to yellow, magenta, cyan and black and wiping members 77p (77pY to 77pK). The cleaning sheet 77b moves a foreign matter on the surface of the dustproof member 43, and the wiping member 77p wipes off the foreign matter on the surface of the dustproof member 43. When the cleaning member 77 is to clean the surface of the dustproof member 43, the cleaning sheet 77b and the wiping member 77p move in contact with the surface of the dustproof member. The wiping member 77p is brought into contact with a portion on the surface of the dustproof member 43 where the cleaning sheet 77b is brought into contact, thereby being capable of cleaning off toner, powder dust, and the like adhering to the surface of the dustproof member 43. Note that, the cleaning member 77 reciprocates in the +Y direction and −Y direction to clean the surface of the dustproof member 43. Further, as illustrated in FIG. 5 and FIG. 6, the dustproof member 43 is provided in the scanner cover 41 while projecting from the outer surface of the scanner cover 41 (by a projection amount D43). With this, the cleaning member 77 is easily brought into contact with the dustproof member 43.

<Frame Member of Image Forming Apparatus>

Figure 7:
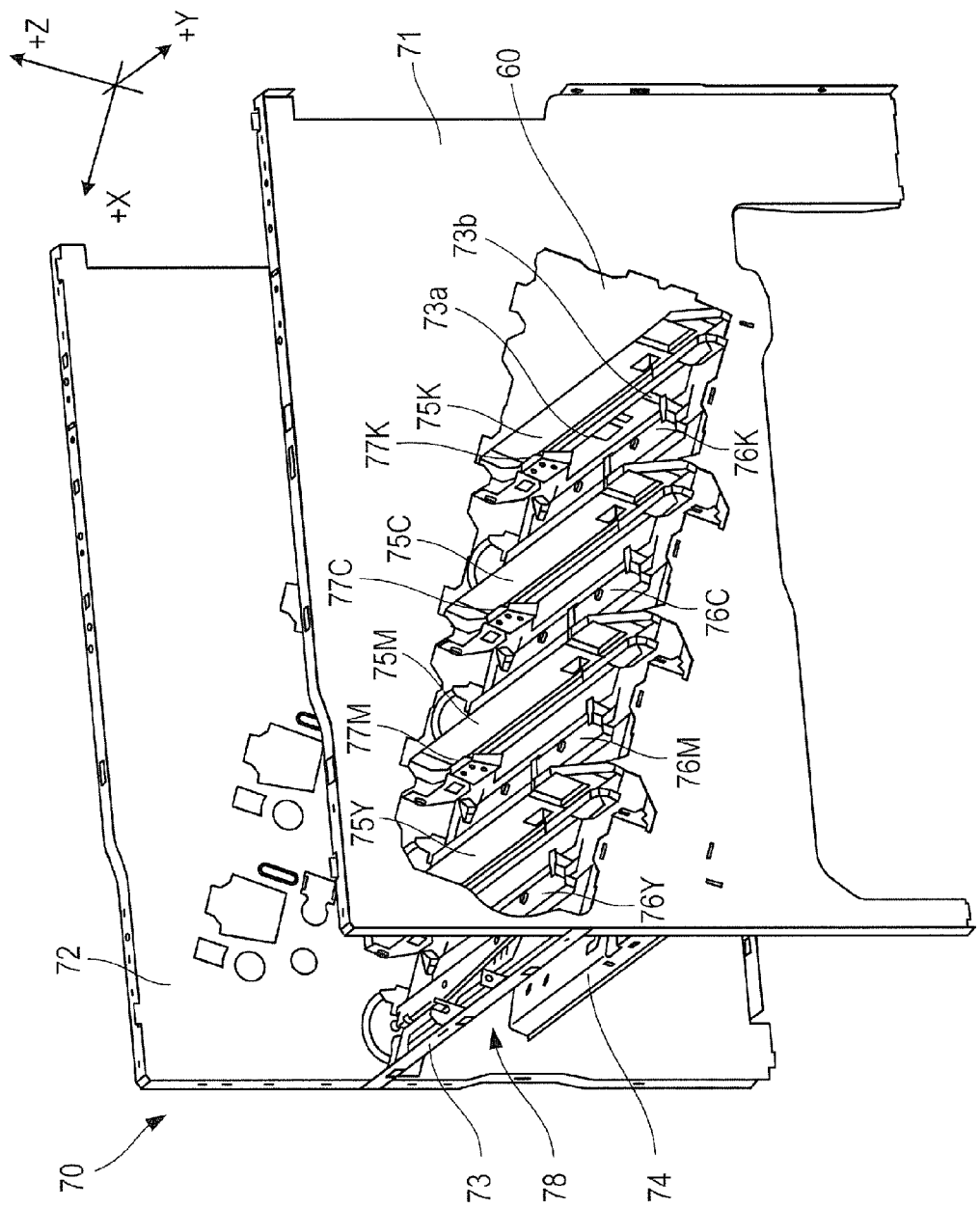
FIG. 7 is a view for illustrating a frame member of the image forming apparatus in which the optical scanning apparatus is installed according to the first embodiment of the present invention.

The frame member of a body of the image forming apparatus is described with reference to FIG. 7. FIG. 7 is a perspective view of the frame member of the image forming apparatus. In the following description, the front side of the image forming apparatus 100 is defined to be an end side in a direction in which cartridges PY to PK are pulled out of an opening 60 of a frame member 70, namely an end side in the +Y direction in FIG. 7. Further, the rear side of the image forming apparatus 100 is defined to be an end side in the −Y direction. Moreover, the left side is defined to be a left side when the frame member is viewed from the front side, and the right side is defined to be a right side when the frame member is viewed from the front side.

The frame member 70 includes a front-side plate located on the front side, and a rear-side plate 72 located on the rear side. A body support member 73 and a scanner support member 74 are mounted between the front-side plate 71 and the rear-side plate 72. The front-side plate 71 and the rear-side plate 72 are fixed to the body support member 73 and the scanner support member 74 with screws (not shown), or by welding or the like, to thereby construct the frame member of the image forming apparatus body.

The optical scanning apparatus 5 is mounted to the body support member 73 and the scanner support member 74. The body support member 73 has a support hole 73a, a support hole 73b, and a further unshown support hole for the scanner. Further, various mechanisms, such as cartridge mounting guide rails 75Y to 75K for mounting the four cartridges and developing roller separation mechanisms 76Y to 76K, are mounted to the +Z direction side of the body support member 73. Moreover, various mechanisms, such as the cleaning member 77Y (see FIG. 5) and the cleaning members 77M to 77K, are mounted to the +Z direction side of the body support member 73. In order to mount the various mechanisms to the body support member 73, a part of each of the various mechanisms penetrates the body support member 73 and projects to the optical scanning apparatus 5 side (−Z direction side).

The four cartridges PY to PK can be inserted and pulled out in the Y direction through the opening 60 formed in the front-side plate 71. Further, the optical scanning apparatus 5 can be inserted and pulled out through an insertion opening 78 that is formed on the left side of the frame member 70 and is exposed by removing an exterior member (not shown) provided on the left side surface of the frame member 70. Note that, the insertion opening 78 is assumed to have such a size that the optical scanning apparatus 5 can be easily inserted and pulled out.

<Installation of Optical Scanning Apparatus>

Figure 8:
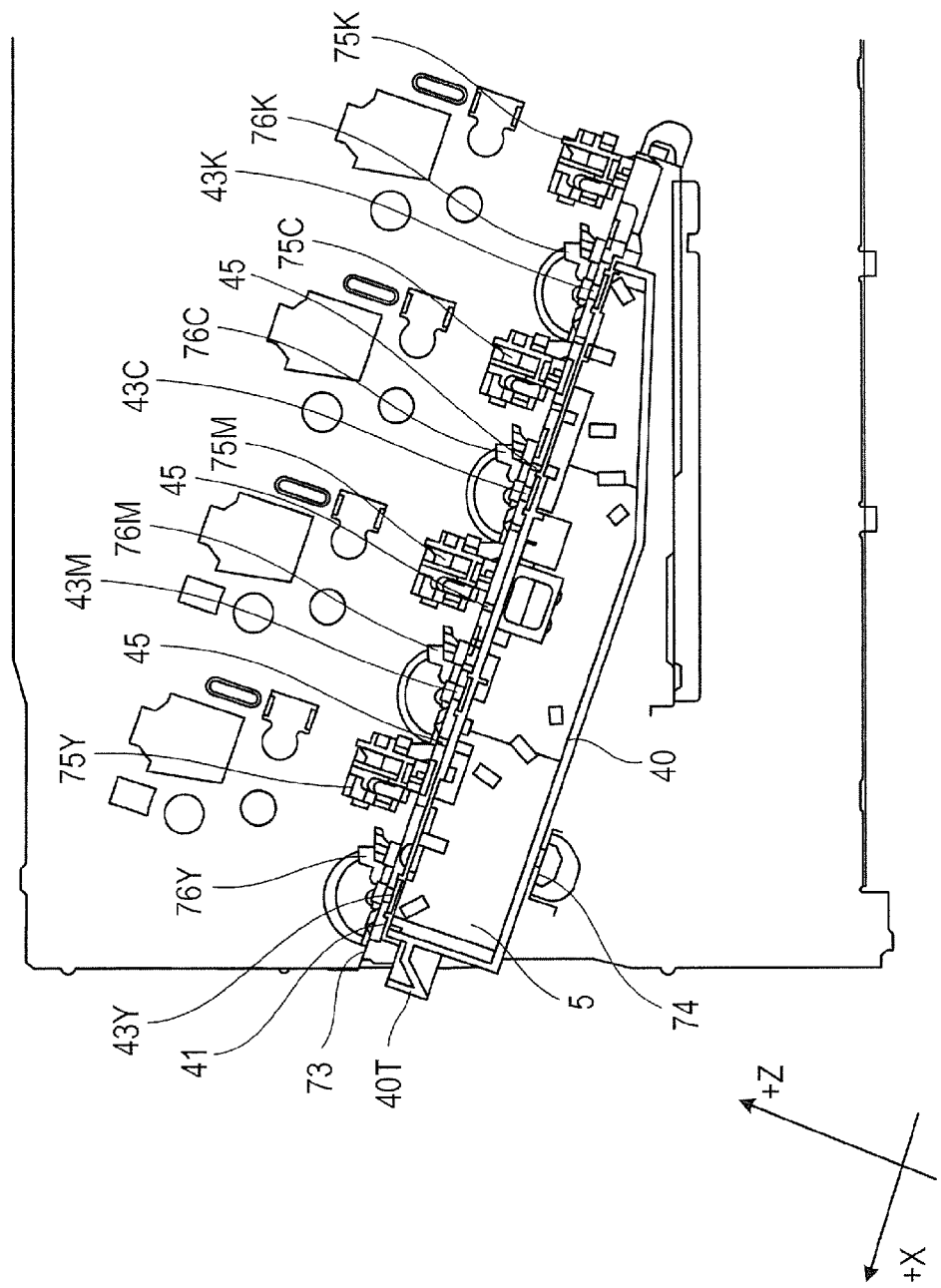
FIG. 8 is a view for illustrating a state in which the optical scanning apparatus is installed in the frame member according to the first embodiment of the present invention.
Figure 9:
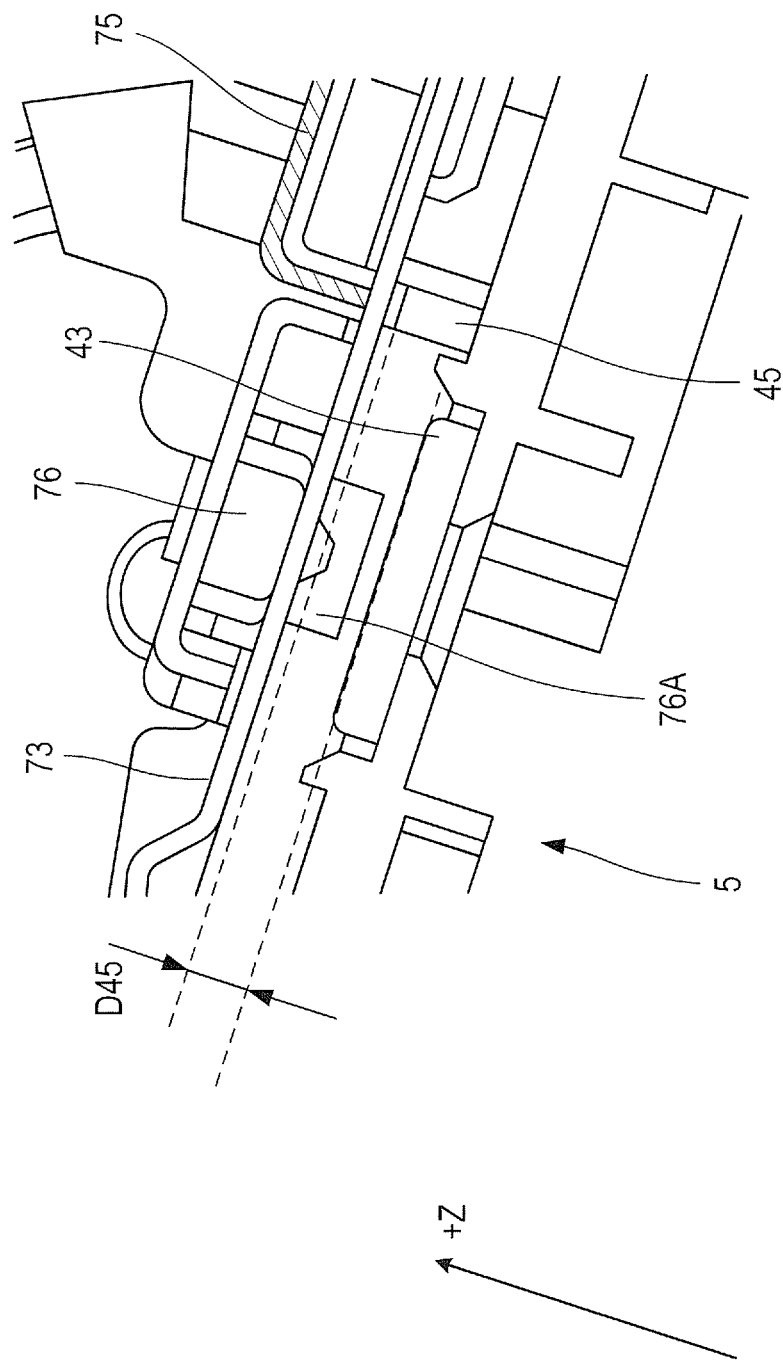
FIG. 9 is an enlarged view for illustrating the state in which the optical scanning apparatus is installed in the frame member.

Next, a method of installing the optical scanning apparatus is described with reference to FIG. 8 and FIG. 9. FIG. 8 is a view of the frame member 70 having the optical scanning apparatus 5 installed thereto when viewed from the +Y direction. FIG. 9 is an enlarged view of the vicinity of the dustproof member 43 under the state in which the optical scanning apparatus 5 is installed in the frame member 70. In FIG. 8, when the optical scanning apparatus 5 is to be inserted into the frame member 70, an assembly operator holds a handle 40T on the optical box 40 and inserts the optical scanning apparatus 5 in the −X direction under the state in which the upper surface of the scanner support member 74 is held in contact with the bottom surface of the optical box 40.

When the optical scanning apparatus 5 is to be inserted into the frame member 70, the various mechanisms projecting from the body support member 73 to the optical scanning apparatus 5 side (−Z direction side) may be brought into contact with the dustproof members 43Y to 43K. Specifically, a part of each of the various mechanisms, such as the cartridge mounting guide rails 75Y to 75K, the developing roller separation mechanisms 76Y to 76K, and the cleaning members 77Y to 77K for the dustproof members, may be brought into contact with the dustproof members 43Y to 43K.

However, the optical scanning apparatus 5 includes the projecting portions 45 provided on the scanner cover 41 while projecting with respect to the dustproof members 43Y to 43K. Even when the dustproof members 43Y to 43K come close to the various mechanisms, the projecting portions 45 are brought into abutment against the various mechanisms in advance of the dustproof members 43Y to 43K, thereby being capable of preventing the contact between the dustproof members 43Y to 43K and the various mechanisms. In FIG. 9, the projecting portion 45 projects with respect to the dustproof member 43 by a projection amount D45.

Further, when the optical scanning apparatus 5 is to be inserted into the frame member 70, the bottom surface of the optical box 40 may rise from the upper surface of the scanner support member 74 depending on the way of assembling by the assembly operator, and the optical scanning apparatus 5 may move in the +Z direction. In this case, as illustrated in FIG. 9, the dustproof member 43 comes close to a part 76A of the developing roller separation mechanism 76 that projects from the body support member 73 to the optical scanning apparatus 5 side. However, the projecting portion 45 is brought into contact with the body support member 73 in advance of the dustproof member 43, thereby being capable of suppressing the contact between the part 76A of the developing roller separation mechanism 76 and the dustproof member 43.

Finally, a support protrusion 5a and a support protrusion 5b (see FIG. 4) provided on the optical scanning apparatus 5 are fitted into the support hole 73a and the support hole 73b (see FIG. 7) formed in the body support member 73, to thereby fix the optical scanning apparatus 5 to the body support member 73. Note that, a support protrusion 5c is fitted into the unshown support hole arranged symmetrically to the support hole 73a across the support hole 73b in the +Y direction.

As described above, in the first embodiment, the dustproof member projects from the outer surface of the housing (outer surface of the scanner cover) of the optical scanning apparatus. With this, the cleaning member is easily brought into abutment against the dustproof member when the cleaning member is to clean the dustproof member.

Further, in the first embodiment, the projecting portion 45 projecting with respect to the dustproof member is provided on the surface (scanner cover) of the housing of the optical scanning apparatus where the dustproof member is provided. Accordingly, at the time of installing the optical scanning apparatus into the frame member of the image forming apparatus body, it is possible to suppress the contact between the dustproof member and the various mechanisms mounted to the image forming apparatus. It is possible to suppress damage on the dustproof member, which may be caused by the contact between the dustproof member and the various mechanisms.

Further, in the first embodiment, under the state in which the optical scanning apparatus is installed in the frame member of the image forming apparatus body, the projecting portions 45a to 45e are arranged in the vicinities of both ends of the scanner cover in the laser scanning direction (Y direction). Accordingly, even when the optical scanning apparatus is inserted into or pulled out of the frame member while being inclined with respect to the laser scanning direction, it is possible to effectively protect the dustproof member.

Moreover, in the first embodiment, the projecting portions 45a to 45c, which are parts of the plurality of projecting portions provided on the scanner cover, are each provided at regular intervals between the adjacent dustproof members in an arraying direction of the cartridges. Parts of the body components that project from the body support member 73 to the optical scanning apparatus side are mechanisms corresponding to the four cartridges. Hence, parts of the body components that have the same function are arranged in the image forming apparatus at equivalent intervals to intervals between the adjacent photosensitive drums in the cartridge arraying direction (X direction in the figures). Meanwhile, the projecting portions 45a to 45c are provided at regular intervals. With this configuration, it is possible to effectively prevent the contact between the dustproof member and the body components by virtue of the projecting portions 45a to 45c in the vicinities of the body components provided at regular intervals and projecting from the body support member 73.

Moreover, at the time of sliding the optical scanning apparatus in the cartridge arraying direction to install the optical scanning apparatus into the frame member, the dustproof member that is firstly inserted into the frame member is protected by the projecting portion firstly inserted into the frame member, and the dustproof member that is secondly inserted into the frame member is protected by the projecting portion secondly inserted into the frame member. That is, each of the dustproof members can be protected by the projecting portion corresponding thereto in accordance with sliding of the optical scanning apparatus.

Second Embodiment

Figure 10:
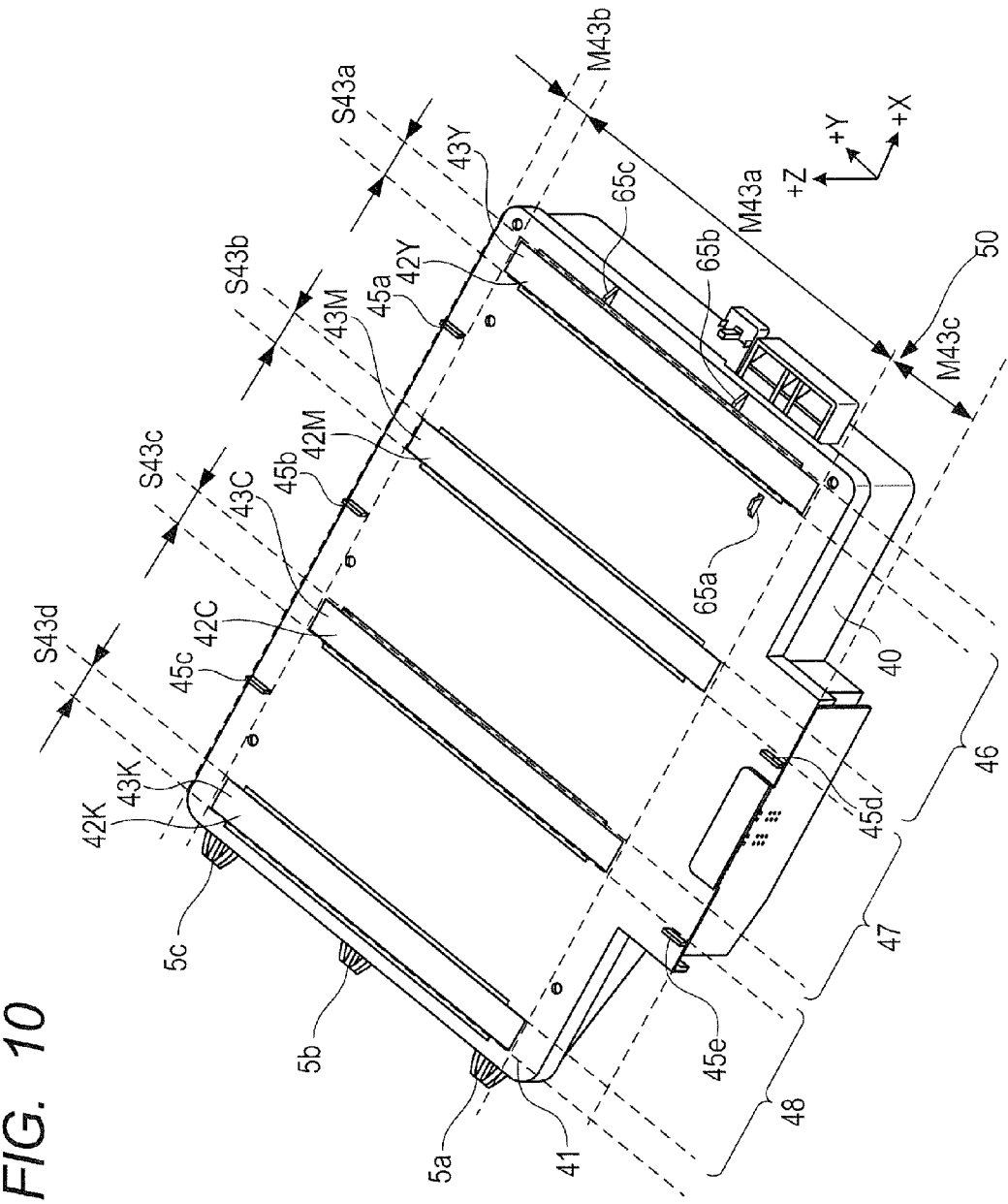
FIG. 10 is an external view of an optical scanning apparatus including projecting portions according to a second embodiment of the present invention.
Figure 11:
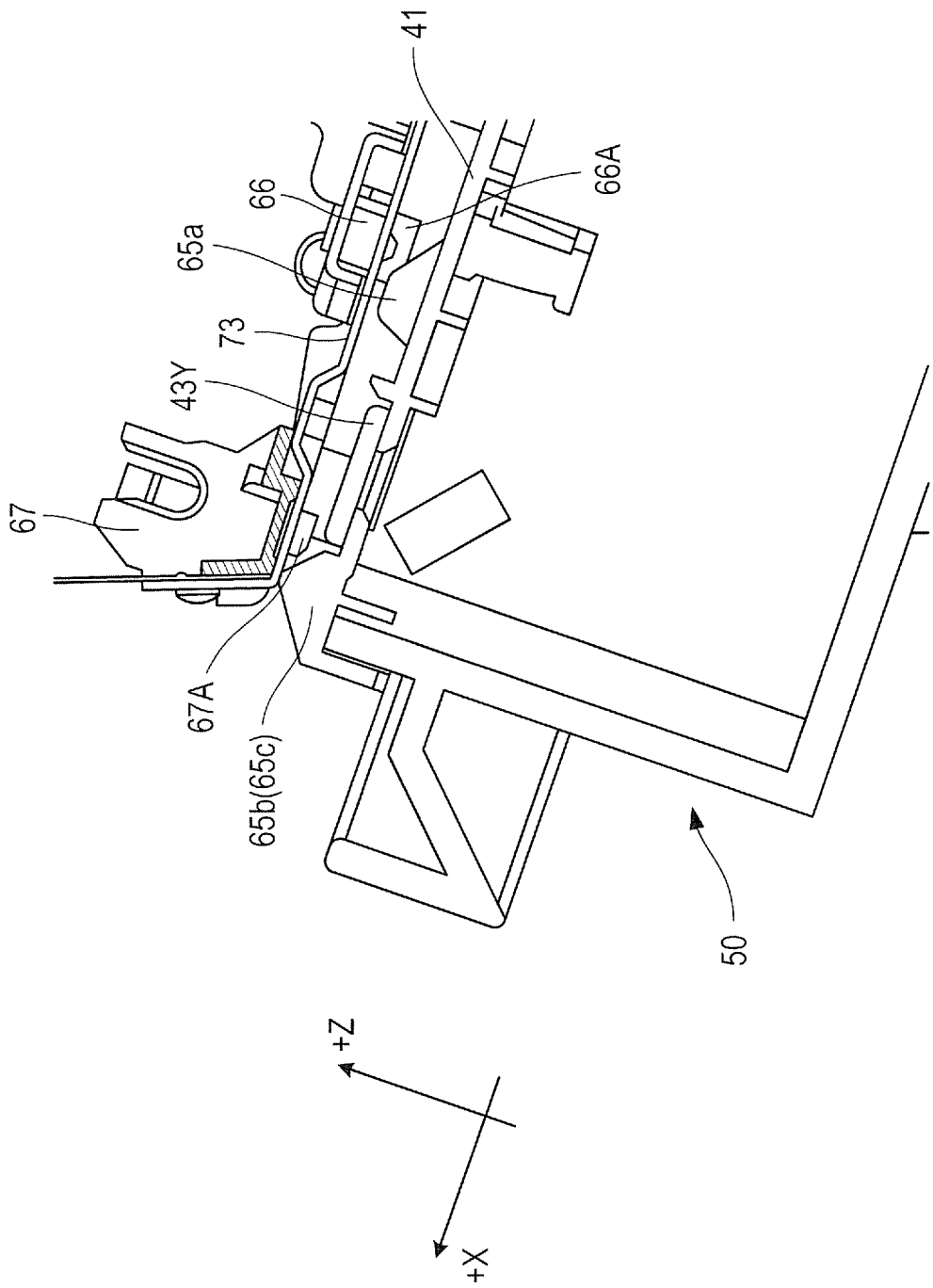
FIG. 11 is an enlarged view for illustrating a state in which the optical scanning apparatus is installed in a frame member according to the second embodiment of the present invention.

A second embodiment of the present invention is described with reference to FIG. 10 and FIG. 11. FIG. 10 is an external perspective view of an optical scanning apparatus including projecting portions. FIG. 11 is an enlarged view of the vicinity of the dustproof member 43Y under the state in which an optical scanning apparatus 50 is installed in the frame member 70. In the second embodiment, portions having similar functions to those in the first embodiment are denoted by the same reference symbols, and the description thereof is omitted. Further, the optical scanning apparatus 50 in the second embodiment has a similar configuration to that of the optical scanning apparatus 5 in the first embodiment.

In the second embodiment, similarly to the first embodiment, the projecting portions 45 (45a to 45e) are provided on the scanner cover 41. In addition, in the second embodiment, a projecting portion 65b and a projecting portion 65c are provided on the scanner cover 41. Under the state in which the optical scanning apparatus 50 is installed in the frame member 70, the projecting portion 65b and the projecting portion 65c are provided closer to the insertion opening 78 side than the dustproof member 43Y that is arranged at a position closest to the insertion opening 78 out of the plurality of dustproof members 43Y to 43K. That is, the image forming apparatus is configured such that the unit 50 is mounted into the frame member 70 of the image forming apparatus while being moved in the sub-scanning direction (X direction). Further, in the unit mounting direction, the second projecting portions 65b and 65c projecting with respect to the dustproof member are also provided on the housing 40 on the upstream side of the transparent member 43Y provided on the most upstream side of the housing 40. The second projecting portions 65b and 65c are provided in the area M43a. Note that, in the second embodiment, similarly to the first embodiment, the optical scanning apparatus 50 is mounted to the body support member 73 and the scanner support member 74 that are mounted to the frame member 70. Further, a third projecting portion 65a is provided on the scanner cover 41 such that the dustproof member 43Y lies between the third projecting portion 65a and the projecting portions 65b and 65c in the arraying direction (X direction) of the cartridges PY to PK. The third projecting portion 65a is also provided in the area M43a.

When the optical scanning apparatus 50 is installed into the frame member 70, as illustrated in FIG. 11, the dustproof member 43Y comes close to a part 66A of each of various body components 66, which projects from the body support member 73 to the optical scanning apparatus 50 side. Further, the dustproof member 43Y comes close to a part 67A of each of various body components 67, which projects from the body support member 73 to the optical scanning apparatus 50 side. However, the projecting portions 65a to 65c can suppress the contact between the dustproof member 43Y and the body components 66 and the body components 67.

The second embodiment has a similar effect to that of the first embodiment. In addition, in the second embodiment, under the state in which the optical scanning apparatus is installed in the frame member, the projecting portions 65b and 65c are provided closer to the insertion opening side than the dustproof member arranged at the closest position to the insertion opening out of the plurality of dustproof members. Thus, even immediately before insertion of the optical scanning apparatus into the frame member is completed, the dustproof member can be protected by the projecting portions 65b and 65c.

Third Embodiment

Figure 12:
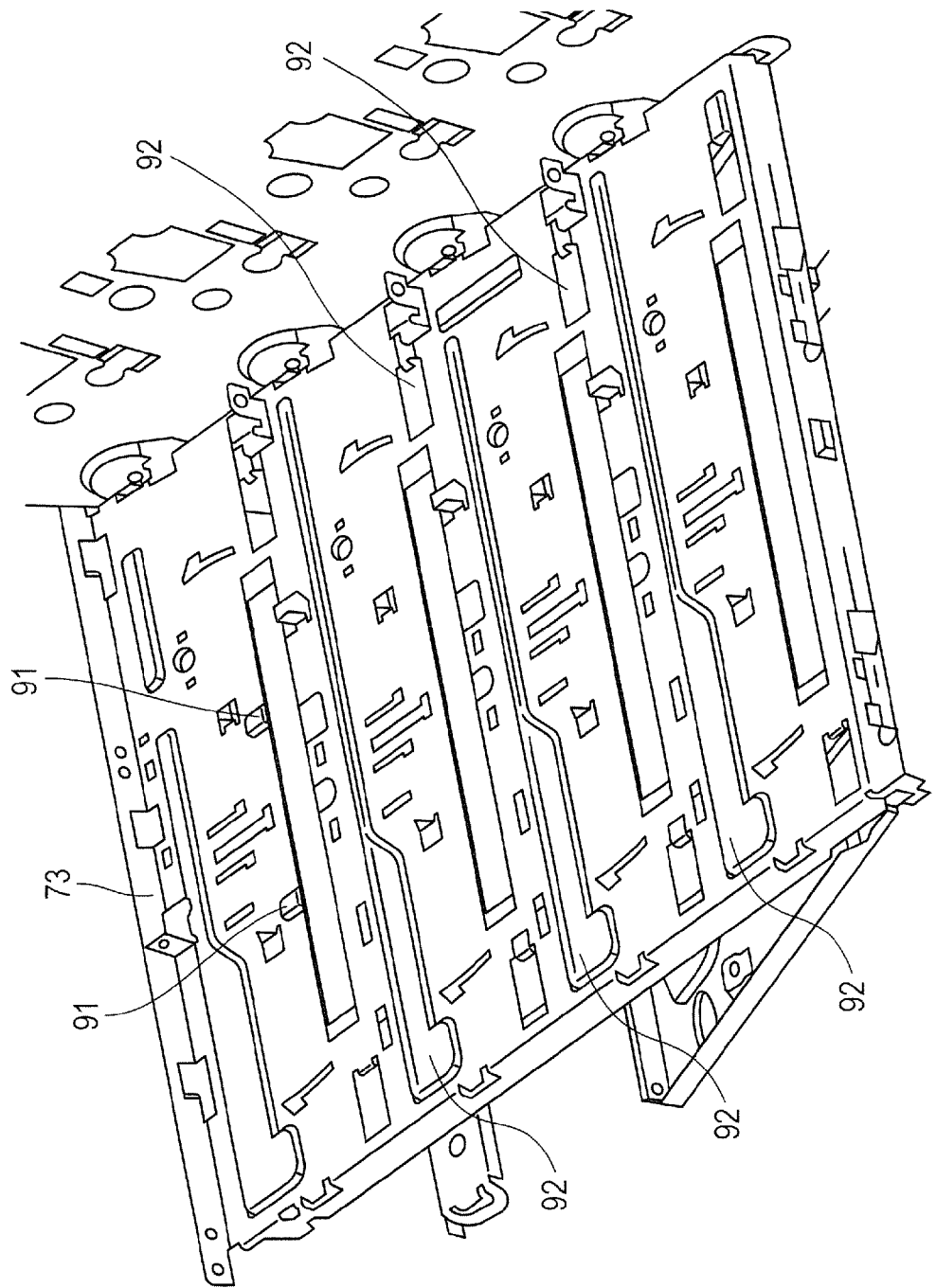
FIG. 12 is a view for illustrating a support member configured to support an optical scanning apparatus according to a third embodiment of the present invention.
Figure 13:
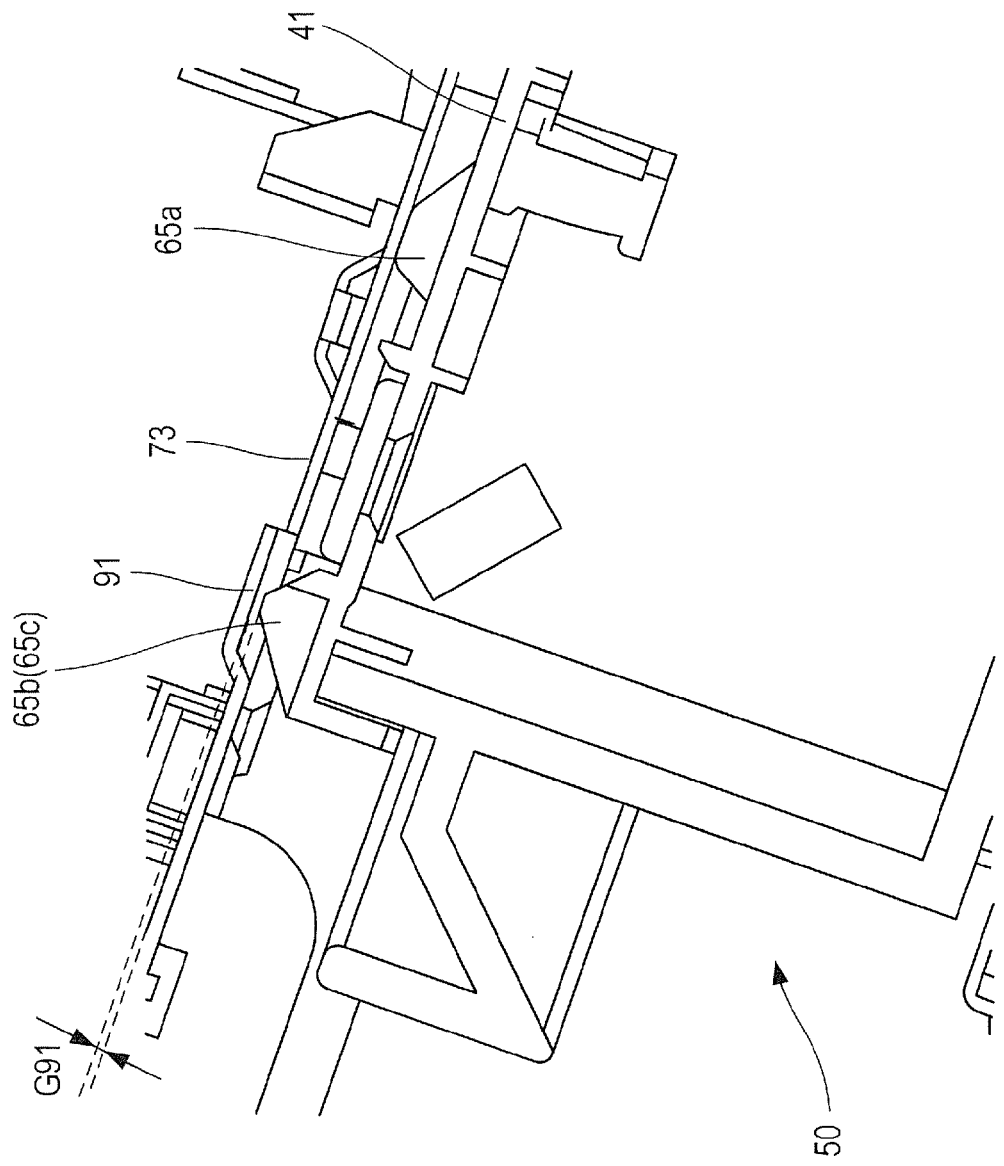
FIG. 13 is an enlarged view for illustrating a state in which the optical scanning apparatus is installed in a frame member according to the third embodiment of the present invention.

A third embodiment of the present invention is described with reference to FIG. 12 and FIG. 13. FIG. 12 is a perspective view of a body support member to be installed in the frame member of the image forming apparatus body. Further, FIG. 13 is an enlarged view of the vicinity of the dustproof member 43Y under the state in which the optical scanning apparatus 50 is installed in the frame member 70. In the third embodiment, portions having the same functions as those in the second embodiment are denoted by the same reference symbols, and the description thereof is omitted. In the third embodiment, a recessed portion 91 and a recessed portion 92 are formed in the body support member 73 so as to form a gap between the body support member 73 and each of the projecting portions 65a to 65c, and a gap between the body support member 73 and the projecting portion 45 under the state in which the optical scanning apparatus 50 is supported by the frame member 70 (state in which mounting of the apparatus 50 at a predetermined position in the frame member 70 is completed).

As illustrated in FIG. 13, under the state in which the optical scanning apparatus 50 is supported by the body support member 73 and the scanner support member 74, each of the projecting portions 65a to 65c provided on the scanner cover 41 is arranged so as to face the recessed portion 91 formed in the body support member 73. In this case, a gap G91 is formed between each of the projecting portions 65a to 65c and the body support member 73. Further, under the state in which the optical scanning apparatus 50 is supported by the body support member 73 and the scanner support member 74, the projecting portion 45 provided on the scanner cover 41 is arranged so as to face the recessed portion 92 (see FIG. 12) formed in the body support member 73. In this case, a gap is formed between the projecting portion 45 and the body support member 73.

The third embodiment has a similar effect to that of the second embodiment. In addition, in the third embodiment, the gap is formed between the body support member and the projecting portion under the state in which the optical scanning apparatus is supported by the frame member, thereby being capable of installing the optical scanning apparatus into the frame member while preventing the contact between the projecting portion and the body support member. With this, application of stress, which is generated due to the contact between the projecting portion and the body support member, to the optical scanning apparatus can be prevented at the time of image formation, thereby being capable of suppressing color misregistration and deterioration in image quality such as printing accuracy.

Note that, in each of the embodiments, the projecting portion is desirably provided at a position separated from the portions of the optical scanning apparatus where the reflection mirrors, the lenses, and the like are fixed. With this, fluctuations in postures of the lenses and the reflection mirrors are prevented even when the projecting portion is brought into contact with the frame member so that stress is applied to the optical scanning apparatus, thereby being capable of forming an image without deterioration in image quality.

In Embodiments 1 to 3, the projecting portions 45a to 45e and the projecting portions 65a to 65c are provided on the scanner cover. However, in the case of an apparatus in which an aperture for a laser beam is formed in the optical box 40 being a part of the housing of the optical scanning apparatus, a protrusion may be provided in the optical box 40.

According to the present invention, at the time of mounting the optical scanning apparatus into the image forming apparatus, it is possible to prevent damage on the dustproof member provided on the housing of the optical scanning apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-259000, filed Dec. 22, 2014, and Japanese Patent Application No. 2015-199219, filed Oct. 7, 2015, which are hereby incorporated by reference herein in their entirety.

What is claimed is:

1. An image forming apparatus, comprising:
   a photosensitive member; and
   an optical scanning unit configured to scan the photosensitive member with a laser beam, the optical scanning unit comprising:
      a housing having an aperture through which the laser beam is to be emitted; and
      a transparent member provided at the aperture,
   wherein the housing comprises a projecting portion projecting in a laser emitting direction with respect to the transparent member, the projecting portion being provided in an area of the housing outside an area in which the transparent member is provided, in a main scanning direction and outside the area in which the transparent member is provided, in a sub-scanning direction.

2. An image forming apparatus according to claim 1, wherein the projecting portion is provided in each of areas of the housing outside the area in which the transparent member is provided, in a main scanning direction.

3. An image forming apparatus according to claim 1, wherein the transparent member projects in the laser emitting direction with respect to a portion on the housing around the area in which the transparent member of the housing is mounted.

4. An optical scanning apparatus configured to scan a surface to be scanned with a laser beam, the optical scanning apparatus comprising:
   a housing having an aperture through which the laser beam is to be emitted; and
   a transparent member provided at the aperture,
   wherein the housing comprises a projecting portion projecting in a laser emitting direction with respect to the transparent member, the projecting portion being provided in an area of the housing outside an area in which the transparent member is provided, in a main scanning direction and outside the area in which the transparent member is provided, in a sub-scanning direction.

5. An optical scanning apparatus according to claim 4, wherein the projecting portion is provided in each of areas of the housing outside the area in which the transparent member of the housing is provided, in a main scanning direction.

6. An optical scanning apparatus according to claim 4, wherein the transparent member projects in the laser emitting direction with respect to a portion on the housing around the area in which the transparent member of the housing is mounted.

7. An image forming apparatus, comprising:
   a first photosensitive member;
   a second photosensitive member; and
   an optical scanning unit configured to scan the first photosensitive member and the second photosensitive member with a first laser beam and a second laser beam, the optical scanning unit comprising:
      a housing having a first aperture through which the first laser beam is to be emitted and a second aperture through which the second laser beam is to be emitted;
      a first transparent member provided at the first aperture; and
      a second transparent member provided at the second aperture,
   wherein the housing comprises a projecting portion projecting in a laser emitting direction with respect to the first transparent member and the second transparent member, the projecting portion being provided in an area between the first and second transparent members, and the area outside an area in which the first and second transparent members are provided, in a main scanning direction.

8. An image forming apparatus according to claim 7, wherein the projecting portion is provided in each of areas of the housing outside the area in which the first and second transparent members are provided, in a main scanning direction.

9. An image forming apparatus according to claim 7, wherein:
   the image forming apparatus is configured such that the optical scanning unit is mounted into a frame member of the image forming apparatus while being moved in the sub-scanning direction; and
   the housing further comprises a second projecting portion projecting in the laser emitting direction with respect to the first transparent member and the second transparent member, the second projecting portion being provided on an upstream side of the housing in a unit mounting direction with respect to one of the first transparent member and the second transparent member, which is provided on a most upstream side of the housing in the unit mounting direction.

10. An image forming apparatus according to claim 9, wherein the second projecting portion is provided in an area in the main scanning direction, in which the first transparent member and the second transparent member are provided.

11. An image forming apparatus according to claim 7, wherein the first transparent member and the second transparent member project in the laser emitting direction with respect to a portion on the housing around a portion at which the first transparent member and the second transparent member are mounted.

12. An optical scanning apparatus configured to scan a surface to be scanned with a laser beam, the optical scanning apparatus comprising:
   a housing having a first aperture through which a first laser beam is to be emitted and a second aperture through which a second laser beam is to be emitted;
   a first transparent member provided at the first aperture; and
   a second transparent member provided at the second aperture,
   wherein the housing comprises a projecting portion projecting in a laser emitting direction with respect to the first transparent member and the second transparent member, the projecting portion being provided in an area between the first and second transparent members, and the area outside an area in which the first and second transparent members are provided, in a main scanning direction.

13. An optical scanning apparatus according to claim 12, wherein the projecting portion is provided in each of areas of the housing outside the area in which the first and second transparent members are provided, in a main scanning direction.

14. An optical scanning apparatus according to claim 12, wherein the housing further comprises a second projecting portion projecting in the laser emitting direction with respect to the first transparent member and the second transparent member, the second projecting portion being provided on an outside of one of the first transparent member and the second transparent member, which is provided closest to an end of the housing in the sub-scanning direction.

15. An optical scanning apparatus according to claim 14, wherein the second projecting portion is provided in an area in which the first and second transparent members are provided in the main scanning direction.

16. An optical scanning apparatus according to claim 12, wherein the first transparent member and the second transparent member project in the laser emitting direction with respect to a portion on the housing around the area in which the first and second transparent members are mounted.

* * * * *